Jan. 26, 1954   J. B. DIFFENDERFER   2,667,429
COATING MIXTURE WITH ADDITION AGENT
AND METHOD OF COATING THEREWITH
Filed Feb. 11, 1949
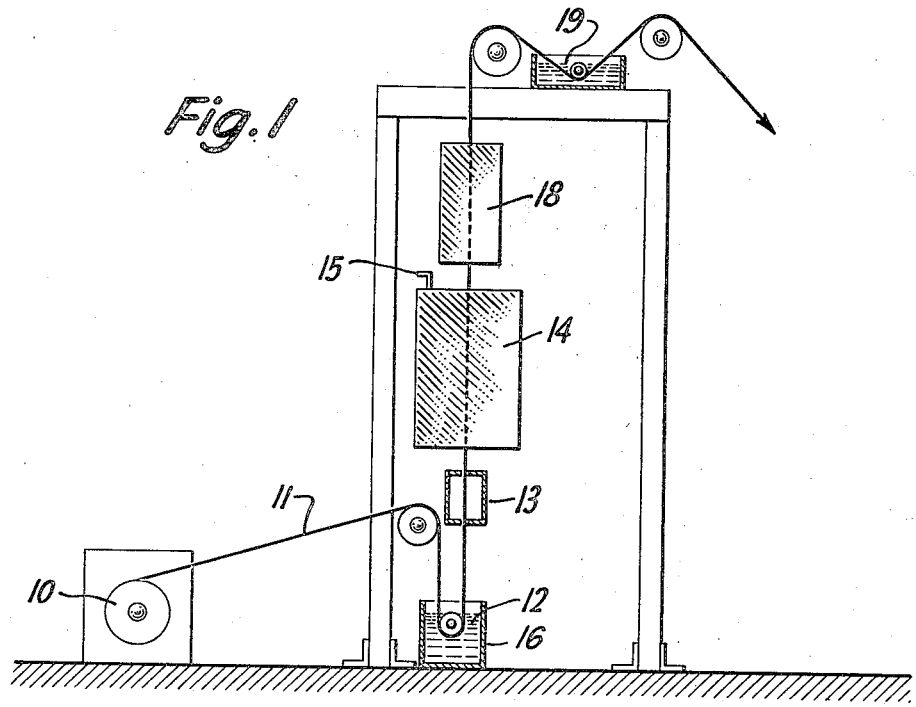
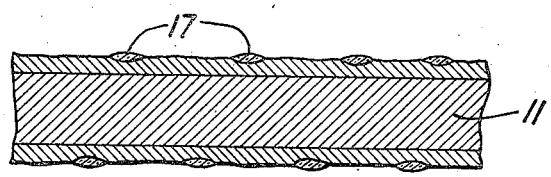
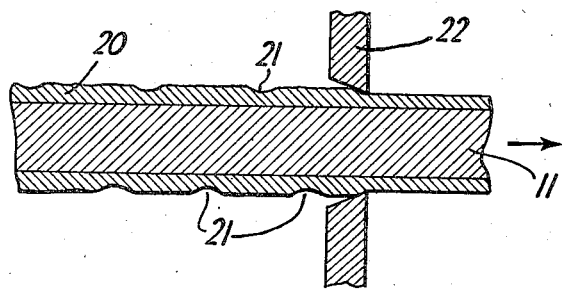
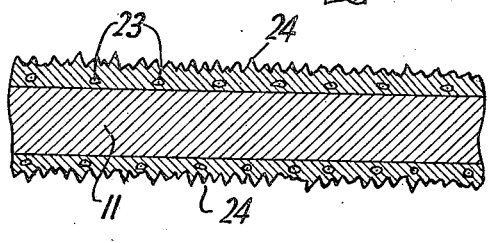
INVENTOR
JOHN B. DIFFENDERFER
BY
William A. Zaleski
ATTORNEY Patented Jan. 26, 1954

2,667,429

UNITED STATES PATENT OFFICE 2,667,429

COATING MIXTURE WITH ADDITION AGENT AND METHOD OF COATING THEREWITH

John B. Diffenderfer, North Caldwell, N. J., assignor to Radio Corporation of America, a corporation of Delaware Application February 11, 1949, Serial No. 75,876

7 Claims. (Cl. 117—65)

The present invention relates to a coating mixture or slurry containing finely divided particles of a metal or metals to be coated, or their oxides, and more particularly to a coating mixture having an addition agent therein for eliminating contaminants in the coating formed by the mixture.

One process for applying a metallic coating to a metal base or core involves electroplating the coating on the base. This process, however, is relatively expensive and usually permits a coating comprised of only one metal to be applied to the base. The electroplating method of coating does not permit for example, the co-deposition of nickel and copper.

Other processes for mechanically applying a metallic coating to a base comprise drag and spraying processes. The drag process involves passage of the base through a slurry containing finely divided particles of one or more metals to be coated or its oxide. The coated base emerging from the slurry or after spraying is then heat treated to reduce the oxide, if the slurry or spray contains the oxide of the metal to be coated, and to sinter the resultant metal particles.

The metal particles are sintered rather than fused because of difficulties heretofore encountered in attempting to fuse them. One difficulty is caused by the presence of contaminating and difficultly reducible oxides in the slurry or spray, which are present in the ore from which the oxides of the metals to be coated are produced, and in the core metal due to certain procedures involved in its manufacture. It has been impracticable to completely remove these contaminating oxides from the slurry or spray. These contaminating oxides may include the oxides of aluminum, magnesium, silicon, calcium or other glassy substances. These objectionable oxides impede a fusion of the metal particles in the coating, except at prohibitively high temperatures, by disposing themselves between adjacent metal particles. To accomplish a fusion under these circumstances, therefore, involves a relatively high temperature and relatively long period of heat application to cause the fused metal particles to travel around intermediate oxide particles. Such relatively high temperatures and long period of heat application are not feasible because of their contribution to an objectionable fusion of the base or core metal itself. In view of the presence of the objectionable oxides in the slurry or spray, prior practices have therefore been restricted to a sintering of the metal particles rather than a fusion thereof.

While the sintering of a coating on a core inherently results in a rough surface, the rough character of the coating surface is further enhanced by the difficultly reducible oxides originally present in the coating slurry.

The rough surface formed on the coating by the sintering operation and enhanced by the presence of the objectionable oxides referred to, occasions several difficulties. For example, where a coating is applied under controlled conditions to provide overall transverse dimensions of a coated component suitable for a particular use, the roughened character of the coating surface may constitute a limitation on the usefulness of the coated component. To avoid this limitation, or for reducing the transverse dimensions of an excessively large coated component, it may be desirable in certain instances to smooth the surface as by the use of dies. However, the drawing through dies of a coated component having a roughened surface and one or more of the contaminating oxides referred to causes an excessive wear on the dies due to the abrasive character of these oxides and to the resistance to die travel presented by the roughened surface.

Accordingly it is the object of the invention to provide an improved coating mixture for application by the drag or spray methods.

A further object is to provide an improved coating mixture and method of application for securing an improved fused coating of a metal or an alloy of several metals on a base.

Another object is to provide an improved coating mixture and method of application for securing a metal coating that is substantially free from abrasive contaminants.

A further object is to provide an improved coating mixture or slurry having a novel addition agent therein for removing abrasive oxides in the coating formed by the mixture and for aiding the formation of a relatively smooth surface on the coating.

Another object is to provide an improved coating mixture having an addition agent therein for dissolving difficultly reducible oxides therein to provide a substantially abrasive-free coating and to reduce the fusion temperature of the coating metal or metals.

Another object is to provide a coating mixture and method of application that results in the elimination of difficultly reducible oxides and a relatively rapid fusion of metal particles in the mixture to form a coating having a relatively smooth surface free from abrasives for preventing excessive wear on dies through which the coated component may be drawn.

Further advantages and objects of the invention will become evident as the present description thereof proceeds. Referring to the drawing:

Figure 1 shows in part schematically one example of an apparatus suitable for practicing my invention;

Figure 2 is a fragmentary longitudinal section of a coated component such as a wire after it leaves the cooling chamber of my apparatus;

Figure 3 is a fragmentary longitudinal section of a coated component coated in accordance with the invention and indicating the facility with which the coated component may be drawn through a die;

Figure 4 is a fragmentary longitudinal section of a component coated in accordance with the prior art and having a relatively rough surface and a plurality of oxide particles in the coating.

Referring in more detail to the drawing, one suitable apparatus for the practice of my invention is shown in Figure 1. This apparatus includes a drum or other suitable magazine 10 for feeding a supply of base or core stock 11, which may be a wire, to a coating mixture or slurry 12. This slurry may contain in finely powdered form metal or oxide particles of the metal or metals to be coated on the base 11. The slurry also includes objectionable difficultly reducible oxides, such as the oxides of aluminum, magnesium, calcium, silicon or other glassy substances, as contaminants. The slurry, in addition, and in accordance with my invention, contains an addition agent for reacting with the contaminating oxides at a further station of my apparatus.

The base 11 as it emerges from the slurry 12 will have adherent thereto a coating including the contaminating oxides and the addition agent referred to. The base thus coated is passed through a heating chamber 13 where the coated base is dried in air at a temperature of about 200° C. to drive off volatile components of the slurry. The dried coated core is then passed through furnace 14 having a reducing gas such as hydrogen supplied through inlet 15. The furnace 14 is maintained at a temperature sufficiently high to reduce the oxides of the metals to be coated and to then first sinter the metal particles so reduced, or present originally in the slurry in metal form, and then subsequently to fuse the metal particles to form a continuous metallic coating. While the coated core is in the furnace my novel addition agent reacts with any difficultly reducible contaminating oxide in the coating to dissolve the same and to form lens-like formations in the surface of the coating which are subsequently removed by acid bath 19.

As will appear more clearly in the following description of the invention, one advantageous result of the action of my novel addition agent in dissolving objectionable difficultly reducible oxide contaminants in the coating, is to permit a complete fusion of the metal particles in the coating at a lower temperature than would be required to accomplish the fusion with the objectionable oxides present in undissolved form. This feature of my invention is of considerable importance in view of the fact that in many instances the melting point of the base or core is not much higher than the melting point of the metal or metals forming the coating. In such instances the presence of the contaminating oxides may necessitate a temperature for fusion of the metal particles of the coating which is high enough to fuse the core or base as well, resulting in a break in the base, necessitating a shut-down or discontinuance of the coating process.

One embodiment of the invention involves the application of a coating of copper and nickel to a core or base of iron. The melting point of iron is about 1570° C., while the melting point of the resulting copper nickel alloy is about 1250° C. According to the invention a temperature of about 1350° C. in the furnace 14 is sufficient to fuse the nickel and copper particles in the coating to form a copper nickel alloy, and this temperature is sufficiently low to avoid the danger of fusing the iron base. The presence of contaminating oxides in undissolved form in the coating material would have necessitated a higher temperature than 1350° C. in the furnace in order to fuse the nickel and copper metals to form the alloy. Such higher temperature might create danger of fusion of the iron base and consequent disruption of the coating process. The addition agent of my invention however permits the coating of one or more metals on a metallic core wherein the melting points of the metallic core and the coating metals are relatively close.

A complete coating schedule according to the invention where a copper nickel coating is to be applied to an iron base is as follows: A coating mixture or slurry is prepared containing the metals to be coated as oxides in finely divided form. The metals to be coated alternatively may be in metallic form. Suitable suspending mediums such as methanol, and ethylene glycol mono ethyl ether known commercially as Cellosolve solvent, serve as the vehicle for the mixture. To this mixture is added a predetermined amount of an addition agent such as lithium phosphate which is distributed homogeneously in the mixture.

One mixture of the constituents indicated above that has been found advantageous according to the invention includes the following amount of each of the ingredients referred to:

1182 grams $Cu_2O$
573 grams $NiO$
26.3 grams $2Li_3PO_4.H_2O$ (lithium phosphate)
450 cc. methanol
75 cc. Cellosolve solvent These ingredients are first ball milled to comminute the oxide particles. An additional 450 cc. methanol is then added.

The ball milling operation may involve placing the mixture in an iron ball mill jar containing 3000 grams of ½" steel balls and subjecting the jar to rotary motion at the rate of 73 R. P. M. for about 20 hours. The result of this operation is to reduce the particle size of the copper oxide and nickel oxide in the mixture to a value suitable for a good coating.

While the addition agent in the mixture according to the invention has been referred to as lithium phosphate, other addition agents may be used without departing from the invention. For example, sodium and potassium phosphates may be used instead of the lithium phosphate, and in addition to the phosphate form the borates, carbonates, hydroxides, oxides, chlorides, nitrates and sulphides are suitable under certain circumstances. More than one of the addition agents mentioned may be used in a coating mixture.

The use of the chlorides, nitrates and sulphides is limited because of their contaminating characteristics. These elements break down in the furnace to the oxides of the metal plus hydrochloric acid, the latter being corrosive and harmful to machinery on which the coated core may subsequently be processed, as in the case of wire used in radio manufacture.

Sodium and potassium phosphates are not as advantageous as lithium phosphate, although they can be used in practicing the invention. Lithium phosphate is preferred because of its greater ability to take into solution the contaminating oxides in the coacting mixture at a lower temperature than is possible with sodium or potassium phosphates.

The coating mixture 12 prepared as indicated above is then placed in tank 16 and the base or core 11 is caused to travel therethrough, as a consequence of which, a portion of the coating mixture adheres thereto. Continuous travel of the base 11 causes it to enter the heating chamber 13 which is maintained at a temperature of about 200° C., and wherein the volatile components of the mixture, such as the methanol and Cellosolve solvent are driven off. The coating remaining on the base after passing through the heating chamber 13 includes the oxides of copper and nickel, the addition agent according to the invention and some contaminating difficultly reducible oxides such as the oxides of aluminum, magnesium, silicon or other glassy substances.

After leaving the heating chamber 13 the base 11 next enters furnace 14 which contains a reducing atmosphere such as hydrogen and is maintained at a temperature of about 1350° C. In the furnace the oxides of nickel and copper are first reduced to metal form in a finely divided state. The finely divided particles of nickel and copper are then sintered and finally fused to provide a continuous metallic coating on the base. The temperature of the furnace 14 is high enough to sinter the copper and nickel particles, to fuse the copper which has a melting point of about 1060° C., and to fuse the copper nickel alloy resulting from the sintering action. The temperature of the furnace is low enough to prevent fusion of the iron core which has a melting point of 1570° C. as indicated before herein. However, the contaminating oxides referred to are not reducible in the furnace referred to.

In addition to the reducing, sintering and fusing operations occurring in the furnace 14, there also takes place a reaction between the addition agent of the invention and the contaminating difficultly reducible oxides referred to above. This reaction comprises taking into solution the contaminating oxides by the addition agent. The resultant solution of the contaminating oxides in the addition agent of the invention travels to the surface of the coating to form a pluraliy of lens-like formations thereon shown at 17 in Figure 2.

After the coated base 11 leaves the furnace 14 it is caused to travel through a cooling chamber 18 also containing a reducing atmosphere such as hydrogen. In this chamber the coating metals and the base metal of the composite coated article are suitably annealed and cooled.

After the coated base has been properly cooled and annealed it is passed through an acid bath 19 which may comprise citric acid. This bath serves to remove the lens formations 17 containing the addition agent and the objectionable difficultly reducible oxides. The removal of the lenses 17 results in a metallic coating 20, shown in Figure 3 of nickel copper alloy having relatively shallow and wide angled depressions 21.

The compound metal body or coated component thus produced is suitable for many applications without further conditioning due to its substantially smooth surface. However, in certain instances it may be desirable to reduce the size of the coated article, and as by drawing it through a die 22. To such drawing operation my invention contributes several advantages. The absence of the contaminating oxides from the coating 20 results in substantial freedom from abrasive wear on the die, and furthermore, the relatively shallow wide angle depressions 21 provide a minimum of impedance to the die travel along the coating, resulting in further freedom from wear on the die. These depressions also serve to carry a drawing lubricant into the die prior to a complete smoothening of the coating and elimination of the depressions.

While the coating mixture above referred to has been described as containing certain relative amounts of the ingredients referred to, including my novel addition agent, certain variations from these relative amounts may be permitted. Thus, while the amount of my novel addition agent in the form of lithium phosphate is indicated as being 26.3 grams, which is 1.5 percent by weight of the copper and nickel oxides present, I have found that percentages of my novel addition agent as low as 1 percent and as high as 2 percent result in a satisfactory coating.

Since the function of my novel addition agent is to dissolve objectionable abrasive oxides in the coating mixture, enough of my addition agent should be used to assure reaction with all of the objectionable oxides present in the coating as it enters the furnace 14. If too little of the addition agent is used, all of the objectionable oxides will not be dissolved thereby, and will persist in the coating to cause a roughened surface thereon and to increase wear on drawing dies. If too much of my addition agent is added to the coating mixture than is required to dissolve all of the contaminating oxides, an excessive number of lenses will be formed in the coating surface. While, as has been indicated, the lenses form relatively shallow and wide angled depressions, which are not as objectionable as the relatively sharp angle nodules formed on the coating by prior art practices, they nevertheless, represent a condition that is undesirable and the depressions should be reduced in number as much as possible.

I prefer to use a standard amount of addition agent in the coating mixture which is about 1.5 percent by weight of the solids in the mixture. According to one aspect of the invention, therefore, I select oxides of the metal to form the coating having an amount of contaminating oxides that is below a predetermined amount, that can be fully dissolved by the amount of my addition agent referred to. The amount of contaminating oxides in the mixture may be determined on the basis of a qualitative test, which I prefer to use, which is made in relation to previously made carefully controlled quantitative analysis. This quantitative analysis revealed that the oxides tested contained 3 percent by weight of the contaminating oxides. On subjecting these oxides so tested quantitatively to a qualitative test comprising sintering the oxides at a temperature of about 1000° C. in a reducing gas or atmosphere for about five minutes, it was found that a poorly cohesive mass resulted. The absence of good cohesion in the mass is believed caused by the relatively large amount of contaminating oxides in the material tested. I have found that where the sintering test referred to results in a cohesive metal mass it indicates the presence of less than 3 percent by weight of the contaminating oxides referred to, and the use of 1.5 percent by weight of my novel addition agent results in a satisfactory elimination of such contaminating oxides. The preferred form of my improved coating process therefore includes the sintering step referred to which indicates qualitatively the contaminating oxide content of the oxides of the metals to be used as a coating. I have found that reducing the amount of addition agent to about 1 percent by weight of the solids in the coating mixture, or increasing it to about 2 percent of said solids, has not been accompanied by adverse effects.

The invention, however, is not limited to a process wherein the amount of addition agent is a fixed reference value and the amount of contaminating oxides is a variable. I may, for example, perform pilot tests on a batch of metal oxides to determine the amount of addition agent required for elimination of the contaminating oxides therein contained. In this situation the amount of addition agent would be coordinated with the amount of contaminating oxides indicated present by such pilot tests.

It is possible that future refining procedures for producing the oxides of metals to be coated, may result in a greater elimination of the contaminating abrasive oxides than is at present feasible. Such greater elimination of the contaminating oxides may reduce the amount of such oxides to a point where a smaller percentage than the minimum of 1 percent referred to of my addition agent may be found satisfactory. It is also possible that for reasons of economy, use of inferiorly processed ores containing more than 3 percent of the contaminating oxides may be used. Here again it would be possible to utilize the invention to advantage by employing more than the 2 percent referred to of the addition agent in the coating mixture. It is thus apparent that the amount of addition agent found suitable for presently obtainable oxides of metals to be coated may be quite different in the event that the amount of contaminating oxides present in the coating mixture should be changed in the future. The invention should therefore not be limited to an addition agent content of the coating mixture that lies between the limits of 1 and 2 percent by weight of the oxides of the metals to be coated and which has under present conditions been found satisfactory. The amount of my addition agent on the other hand should be permitted a range that may be substantially modified by future improvements in the treatment of ores from which the oxides of the metals to be coated are obtained, which may render less than the minimum of 1 percent of my addition agent in the slurry satisfactory. Furthermore, the maximum limit of the range of addition agent present in the coating mixture should be permitted to extend beyond the maximum of 2 percent referred to above, to permit advantageous use of my addition agent in mixtures containing partly refined oxides of the metals to be coated having a larger amount of contaminating oxides than more fully refined ores.

While the invention is particularly suited for coating mixtures containing the oxides of the metal or metals to be coated, it is also of advantage where the mixture contains in metal form the metals to be coated. Where iron wire is used as the base the drawing process often results in the addition thereto of calcium compounds, from the lubricants, for example, which when subjected to the high temperatures of the coating process herein described become hard and abrasive in nature and impractical to remove. In applying a metal coating to such iron base, the calcium compounds will contaminate the coating in the same manner as the abrasive oxides referred to which persist in the oxides of the metals to be coated from the ore state. My novel addition agent serves to remove from the coating the objectionable calcium compounds, which are also abrasive contaminants, as indicated, and is advantageous whether the coating is made from a slurry containing the metal form of the metals to be coated or their oxide form. The amount of my addition agent in a slurry containing the metals to be coated in metal form should be from about 1.5 percent to about 3.5 percent by weight of the metals in the slurry. I have found, however, that in this case also the preferred amount of the addition agent is about 1.5 percent by weight of the metals in the slurry. In this instance the preferred amount of addition agent is close to the lower limit of the range referred to and this is accounted for by the fact that the iron base and the metals to be coated contain a lesser amount of the contaminating abrasive oxides than do the oxides of the metals to be coated. It should be noted that whether the metals used as a coating are in the oxide or metallic state, there is substantially the same amount of contaminating calcium compounds in the core. Therefore, by utilizing the metals used as a coating in metallic form in the slurry, one source of contaminating oxides is eliminated. The relative amount of such contaminating oxides has been found to be less than that present in a slurry containing the oxides of the metals to be coated. Consequently, the lower extreme of the range of addition agent content in the slurry has been found to be preferable.

In Figure 4 is shown a coated core as produced by prior art practices wherein the coating comprises sintered metal particles. This coating also includes particles of difficulty reducible oxides 23 which have an adverse abrasive effect on drawing dies. Furthermore, the presence of these oxides results in a relatively rough surface on the coating having a plurality of nodules or lumps 24, which considerably limits the usefulness of the coated base without a smoothening operation, and contributes to die wear if the coated base is subsequently die drawn.

Applicant therefore has provided an improved coating slurry and method of coating, resulting in a coated article having many advantages, among which may be noted a relatively smooth surface without drawing, and freedom from abrasive oxides and comparatively sharp angle nodules causing abrasive wear on drawing tools. Furthermore, cheaper grades of oxides of the metals to be coated may be employed because of the action of my novel addition agent in dissolving contaminating oxides therein, and the fact that the resultant solution is soluble in acid for removal. My invention is useful in coating a base such as a wire with a metal of different compositions than said wire, the only requirement being that the base have a higher melting point than the coating. It is not necessary that the melting points be greatly spread since the presence of my addition agent in the coating serves to reduce the fusion temperature of the metal or metals in the coating. This effect is believed due to the uniform heating of the coating that is permitted by the presence of my addition agent, which serves to transmit heat across the spaces between the metal particles in the coating. My addition agent has a lower fusing point than copper or nickel, to wit, 837° C., so that it comes into intimate contact with the metal particles in the coating prior to the fusing thereof and fills the spaces between the particles. My invention permits a wide variety in the type of base for coating metals used within the limits specified above. Different coated articles are therefore obtainable in accordance with the invention that have numerous specific characteristics such as resistance to corrosion and oxidation, good weldability, desirable electrical conductivity or resistance, and ability to form a good seal to glass.

The improved method of the invention involves a coating process that is superior to electroplating in adaptability and economy. For example, it permits an alloy to be coated on a base, which is not always possible with the use of electroplating, and in fact is impossible in certain instances, such for example, where a nickel copper alloy is to be plated on the base.

Bases coated in accordance with the invention find particular utility in electron discharge devices. Thus, for control and suppression of secondary emission from certain electrodes, there may be coated on such electrodes a metal or an alloy suitable for this function, such as silver, tin or gold, or alloys thereof.

Various modifications may be made in the above described embodiments of the invention without departing from its spirit and it is therefore desired that the invention be given a scope commensurate with the appended claims.

I claim:

1. A coating mixture for application to an iron base having a predetermined fusion temperature, consisting of: the oxides of nickel and copper in finely divided form and having lower reduction point temperatures and lower fusion point temperatures in the metallic form than said predetermined temperature; aluminum oxide, as a contaminant remaining in said oxides from their natural ore state; a suspending medium for said oxides consisting of methanol and ethylene glycol mono ethyl ether; and a dissolving medium consisting of lithium phosphate present in sufficient amount for dissolving all of said aluminum oxide contaminant at a relatively low temperature, lower than said reduction point and fusion point temperatures; whereby said coating mixture may be applied to said base by a continuous drag method without danger of fusion of said metal base and consequent interruption of said method.

2. A coating mixture according to claim 1 and wherein said mixture includes said lithium phosphate in an amount from 1 to 2% by weight of said oxides of nickel and copper.

3. A coating mixture for application by a continuous drag process to an iron base, said mixture including solids and liquids, the amount of said solids being 1781.3 grams for each 525 cc of said liquids, said solids consisting of by weight of said solids about 26.3 parts lithium phosphate, about 573 parts nickel monooxide, and about 1182 parts cuprous oxide, said solids also including aluminum oxide as a contaminant, said liquids consisting by volume of said liquids of one part of ethylene glycol mono ethyl ether and six parts of methanol, said lithium phosphate being present in an amount to dissolve all of said aluminum oxide contaminant.

4. A coating mixture for coating an iron base with nickel and copper from the oxides thereof at a temperature lower than the fusion temperature of iron, to permit continuous feed of said iron base in strip form through said mixture, reduction of said oxides and the application of a coating of said nickel and copper on portions of said base emerging from said mixture without interrupting said continuous feed, said mixture consisting of the oxides of nickel and copper in finely divided form, aluminum oxide contaminant remaining from the ore source of said oxides, a suspension for said oxides consisting of ethylene glycol mono ethyl ether and methanol, and an addition agent consisting of lithium phosphate present in sufficient amount to dissolve all of said aluminum oxide contaminant and thereby reducing the temperature at which said nickel and copper fuse during the formation of said coating.

5. A coating mixture for coating an iron base with a coating metal selected from the group of metals consisting of nickel, copper, tin and gold and alloys of said metals, having a normal fusion temperature below the fusion temperature of said iron base, said mixture including the oxide of said coating metal in the form of relatively small particles, a suspending medium for said oxide consisting of ethylene glycol mono ethyl ether and methanol, aluminum oxide contaminants, and an improved heat transfer medium consisting of lithium phosphate present in sufficient amount for dissolving all of said aluminum oxide contaminants in said mixture and thereby causing metal particles reduced from said oxide to fuse at a lower temperature than said normal fusion temperature, whereby said coating is free from fusion with said base and said base is preserved from rupture during a coating operation.

6. Method of mechanically coating an iron base with an alloy of copper and nickel; comprising continuously passing successive portions of a strip of said base through a slurry containing the oxides of said copper and nickel, a suspending medium consisting of methanol and ethylene glycol mono ethyl ether, aluminum oxide contaminants, and lithium phosphate present in sufficient amount to dissolve all of said aluminum oxide contaminants; whereby the strip is coated with the materials of said slurry; feeding the coated strip upwardly from said slurry; heating said coated strip at a temperature of about 200° C. to drive off said suspending medium, and further heating said coated strip at about 1350° C. in a reducing atmosphere to first cause said lithium phosphate to take into solution said aluminum oxide contaminants in said slurry and then to reduce said oxides of copper and nickel to metallic form and to fuse the resultant metal; whereby said further heating is effective to fuse said metal at a lower temperature than the normal fusion temperature of said metal with said aluminum oxide in solid form, for preserving said strip from fusion and rupture during said upward feed of said strip.

7. Method of mechanically coating an iron base with a nickel-copper alloy coating having a lower fusion temperature than said base, and above 837° C., whereby said coating is substantially free from diffusion into said iron base; comprising coating said base with a material consisting of: Nickel and copper in the form of relatively small oxide particles, a suspending medium for said particles consisting of methanol and ethylene glycol mono ethyl ether, aluminum oxide contaminants and lithium phosphate having a fusing point temperature of 837° C. and present in sufficient amount to dissolve all of said aluminum oxide contaminants; feeding the coated base to a heating station; heating said base at a temperature of about 200° C. to drive off said suspending medium; and further heating said base at a temperature above 837° C. in a reducing atmosphere, and below the fusion temperature of iron to first fuse said lithium phosphate for uniform dispersion among said oxide particles for dissolving all of said aluminum oxide contaminants and for improved heat transfer between said particles, and then for reducing said oxide particles to metal particles, and for fusing said metal particles to form said coating; whereby said last named heating step is effective to fuse said metal particles at a lower temperature than the normal fusion temperature of said particles for preserving said self-supported portions of said iron base from fusion and rupture.

JOHN B. DIFFENDERFER.

References Cited in the file of this patent

UNITED STATES PATENTS

| Number | Name | Date |
|---|---|---|
| 1,439,780 | Williams | Dec. 26, 1922 |
| 1,735,000 | Dely | Nov. 12, 1929 |
| 1,783,925 | Mongey | Dec. 2, 1930 |
| 1,970,548 | Batten | Aug. 21, 1934 |
| 2,323,169 | Wagenhals | June 29, 1943 |
| 2,351,974 | Kollmar | June 20, 1944 |
| 2,403,706 | Bryant | July 9, 1946 |
| 2,467,544 | Whitcomb | Apr. 19, 1949 |
| 2,474,038 | Davignon | June 28, 1949 |
| 2,510,154 | Tanczyn | June 6, 1950 |

FOREIGN PATENTS

| Number | Country | Date |
|---|---|---|
| 474,064 | Great Britain | 1937 |
| 64,160 | Denmark | Dec. 10, 1945 |